US008533176B2

(12) United States Patent
Pandey et al.

(10) Patent No.: US 8,533,176 B2
(45) Date of Patent: Sep. 10, 2013

(54) BUSINESS APPLICATION SEARCH

(75) Inventors: Prabhat Pandey, Andhra Pradesh (IN);
 Sachin Jindal, Haryana (IN);
 Neelkamal Tyagi, Uttar Pradesh (IN);
 Sutirtha Saha, West Bengal (IN); Imran Basha, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 11/771,554

(22) Filed: Jun. 29, 2007

(65) Prior Publication Data
US 2009/0006330 A1 Jan. 1, 2009

(51) Int. Cl.
*G06F 17/30* (2006.01)

(52) U.S. Cl.
USPC ........... 707/711; 707/696; 707/715; 707/767; 707/758; 707/759

(58) Field of Classification Search
USPC ................. 707/706, 711, 696, 707, 708, 715, 707/767, 759, 758
See application file for complete search history.

(56) References Cited

U.S. PATENT DOCUMENTS

| 5,564,043 | A  | * | 10/1996 | Siefert ................................. 1/1 |
| 6,353,448 | B1 | * | 3/2002 | Scarborough et al. ........ 715/744 |
| 6,523,021 | B1 | * | 2/2003 | Monberg et al. ....................... 1/1 |
| 6,594,654 | B1 | * | 7/2003 | Salam et al. ...................... 707/3 |
| 6,900,807 | B1 |   | 5/2005 | Liongosari et al. |
| 6,944,610 | B2 | * | 9/2005 | Moore et al. .......................... 1/1 |
| 7,007,229 | B2 | * | 2/2006 | DelGobbo et al. ............. 715/212 |
| 7,133,867 | B2 | * | 11/2006 | Irle et al. ........................... 707/4 |
| 7,177,862 | B2 |   | 2/2007 | Zhang et al. |
| 2002/0103797 | A1 |   | 8/2002 | Goel et al. |
| 2003/0078925 | A1 | * | 4/2003 | Chiu et al. ........................ 707/9 |
| 2004/0133564 | A1 | * | 7/2004 | Gross et al. ....................... 707/3 |
| 2004/0199507 | A1 | * | 10/2004 | Tawa, Jr. ............................ 707/7 |
| 2005/0050028 | A1 | * | 3/2005 | Rose et al. ....................... 707/3 |
| 2005/0076023 | A1 | * | 4/2005 | Wu et al. ............................ 707/3 |
| 2005/0149496 | A1 |   | 7/2005 | Mukherjee et al. |
| 2005/0216295 | A1 |   | 9/2005 | Abrahamsohn |
| 2006/0095424 | A1 |   | 5/2006 | Petropoulos et al. |
| 2006/0101046 | A1 | * | 5/2006 | Hargarten et al. ............. 707/101 |
| 2006/0271546 | A1 |   | 11/2006 | Phung |
| 2007/0112758 | A1 | * | 5/2007 | Livaditis ........................... 707/5 |
| 2007/0156659 | A1 | * | 7/2007 | Lim ................................ 707/3 |
| 2007/0299817 | A1 | * | 12/2007 | Mathew et al. ..................... 707/3 |
| 2008/0033954 | A1 | * | 2/2008 | Brooks et al. ..................... 707/9 |
| 2008/0103731 | A1 | * | 5/2008 | Shima et al. .................. 702/187 |
| 2008/0154994 | A1 | * | 6/2008 | Fischer et al. ................ 707/206 |

FOREIGN PATENT DOCUMENTS

WO WO-2007002412 1/2007

OTHER PUBLICATIONS

"CCH@Hand," CCH, 2006, http://cchathand.com/mc/brochure.pdf.
"C360 Core Productivity Pack—for Microsoft@ Dynamics Crm 3.0," http://www.mtccrm.com/CRM-Specifications/c360_Productivity_Pack_Core.htm.
Heck M., "Exalead and Siderean Guide Users down Differing Paths to Data Troves," http://www.infoworld.com/archives/emailPrint.jsp?R=printThis&A=/article/06/07/28/31TCsearch_1.html.
"Live Academic," http://linklog.weblog.ub.rug.nl/node/28.

* cited by examiner

*Primary Examiner* — Anteneh Girma
*Assistant Examiner* — Fatima Mina

(57) ABSTRACT

A method of searching data on a computer system includes accepting a search query, searching multiple applications on the computer system for data related to the search query wherein the data can be in a variety of formats and displaying search results wherein the search results comprise data related to the search query.

20 Claims, 4 Drawing Sheets

BUSINESS APPLICATION SEARCH

BACKGROUND

This Background is intended to provide the basic context of this patent application and it is not intended to describe a specific problem to be solved.

Business users today have a tough time searching data located in multiple back-office information stores as they have to access each of these information stores separately. Related, users can search for the required information only using the search interface offered by each application. Also, some back-office information stores may not even have a global search facility available as part of their client interface, thus, making the task of searching even more arduous. Moreover, after the business user finds all the bits of information through this tedious process, they are still segregated from each other and need to be put together in a summarized form for anyone to be able to analyze them properly. This again may require substantial copy/paste effort from the business users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of searching data on a computer system includes accepting a search query, searching multiple data stores on the computer systems for data related to the search query wherein the data can be in a variety of formats from a variety of applications and displaying search results wherein the search results comprise data related to the search query. The search may only retrieve data that the user has permission to view. A user interface is disclosed that enables the method.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
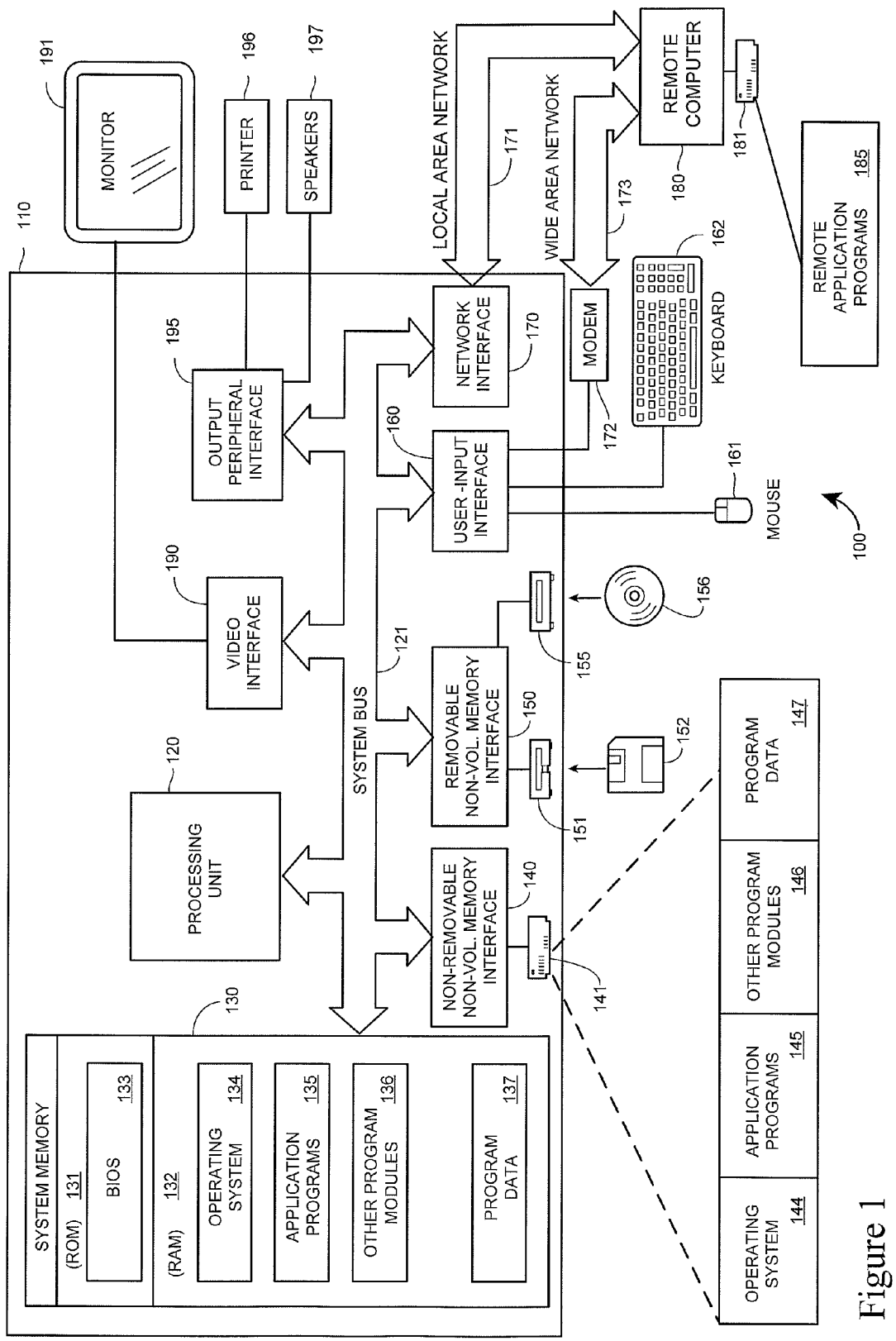
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
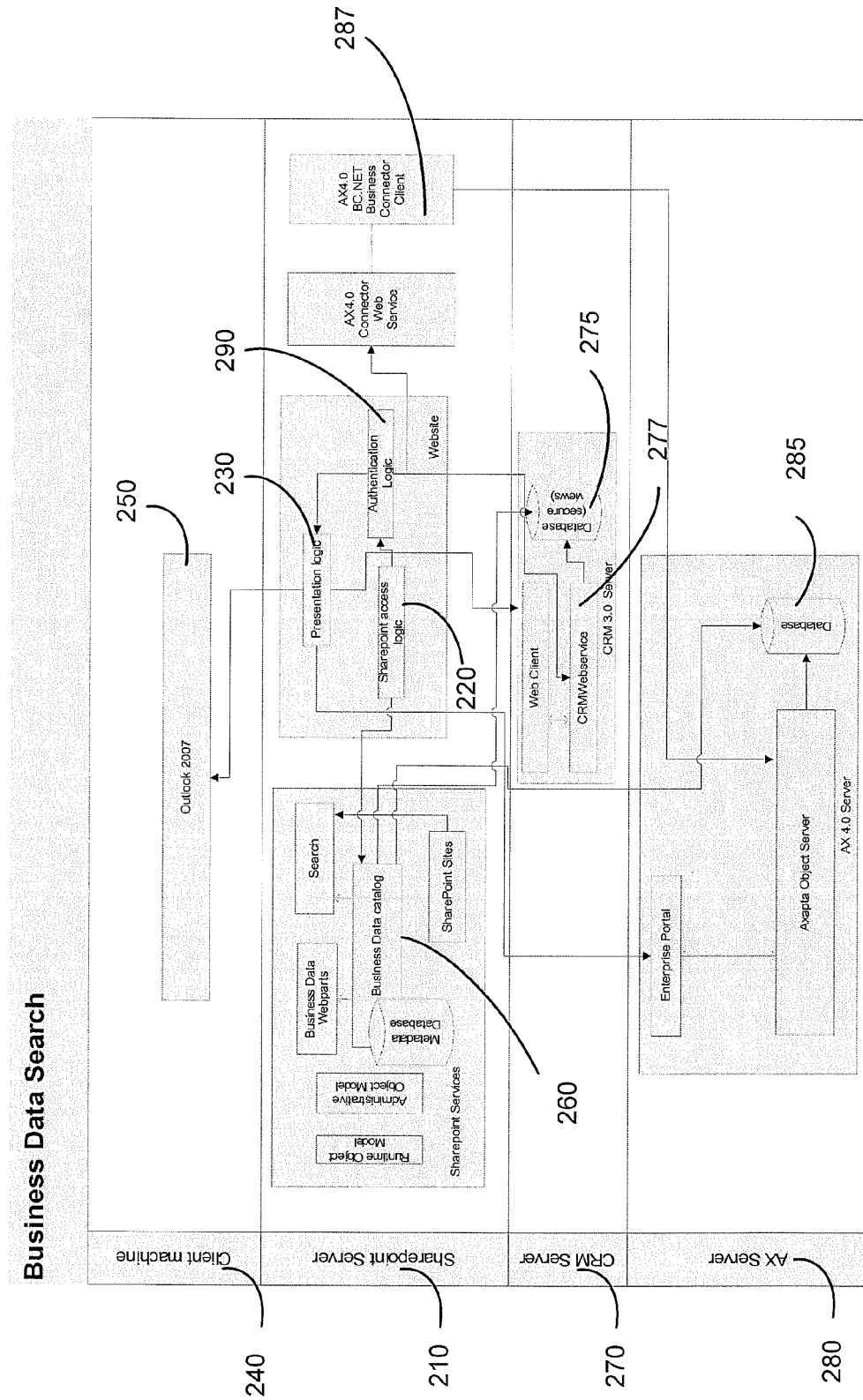
FIG. 2 is an illustration of the software architecture of the business search application.
Figure 3:
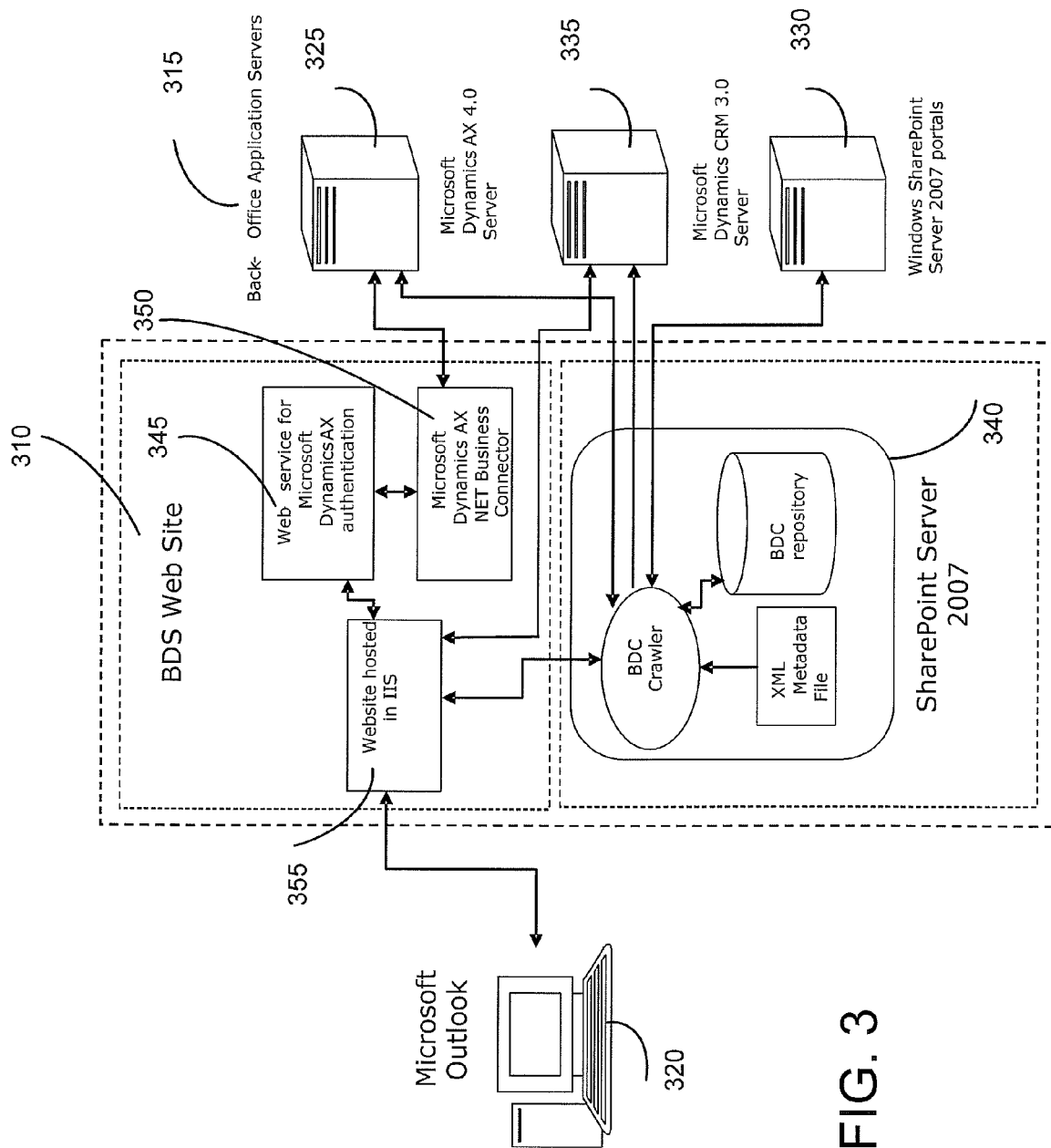
FIG. 3 is an illustration of the elements of the business search elements.
Figure 4:
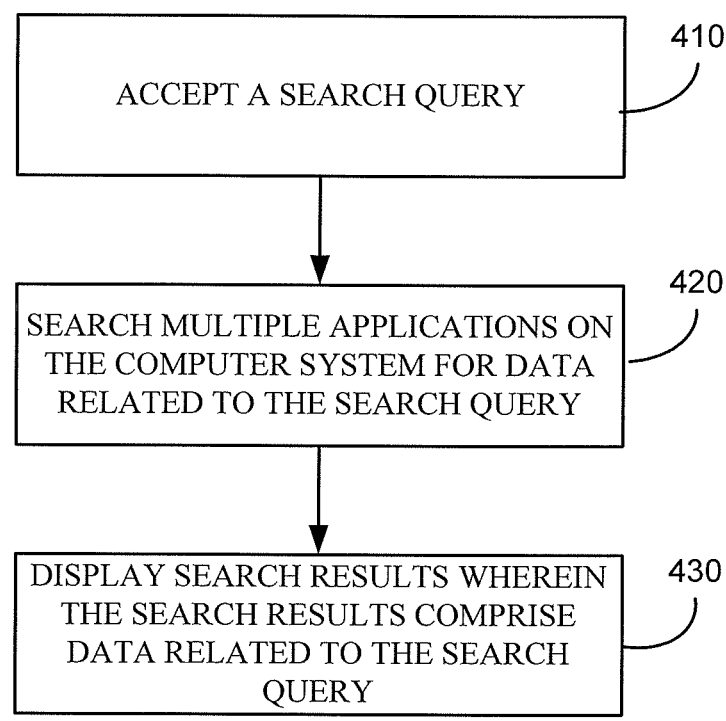
FIG. 4 is an illustration of the steps of a method of searching for data.

FIGS. 2-4 illustrate a method of searching data on one or more computer systems where the computer system has multiple applications which may be business applications. The method may use a catalog of business applications which may contain metadata and an intermediary service to allow the business applications to interact with the search application.

In the Microsoft world of products, the method may be referred to as a Business Data Search ("BDS") snap-in and the BDS may leverage the functionality of the Business Data Catalog core service which is a part of Microsoft Office SharePoint Server 2007. The Business Data Catalog is a catalog of business applications that enables a Microsoft Office SharePoint Server 2007 to interact with other business applications and display business data on the portal or make it available for other applications consumption. The Business Data Catalog may be used to connect to any backend enterprise application through Web Services or database connections. The Business Data Catalog may include a metadata repository and an object model that provide a unified and simple way to invoke operations and a consistent, objectoriented programming interface for business logic that lives in the various business applications.

The metadata repository may use metadata to describe business applications. The metadata may be defined for each physical data source by defining the business entities with which the applications interact and the methods available in the business applications. The metadata model may abstract the underlying physical sources and provide a consistent and simple model for metadata authors working with different kinds of business applications. As metadata is defined in XML, there is not a need to write code to author the metadata. The BDS snap-in uses this functionality of the Business Data Catalog to search for data. The Business Data Catalog helps index Microsoft Dynamics AX 4.0, Microsoft Dynamics CRM 3.0 and other applications. Of course, the method could be applied to a variety of applications.

As can be seen from FIG. 2, the architecture of the BDS Snap-in has four parts. The primary part of the architecture lies in the SharePoint Server 210 where both the Backend search 220 and Front end presentation logic 230 resides. On the client machine 240, there is no need to install anything on the Outlook client side 250. The presentation logic 230 is primarily implemented as an ASPX page that may be hosted on a website and would be rendered within the Outlook client by virtue of setting it as the homepage of an Outlook folder which the user can create easily. Business Data Catalogue 260 would be used to crawl and index the data present in back-office applications like CRM 3.0 270 and AX 4.0 280. BDC would directly interface with the CRM database 275 and AX databases 285 to crawl and index the data. Once the data is crawled, it would be authenticated by the Authentication logic 290 before rendering it through the presentation logic 230. The authentication may happen through Business Connector 287 in case of AX 4.0 and CRM webservice 277 in case of CRM.

Referring now to FIG. 3, the Business Data Search snap-in may consist of a three-tiered architecture with the BDS Server 310 in the middle tier connecting the back-office information systems 315 to the client which is a Webpage displayed within Microsoft Outlook 320 where data search is initiated as well as its results are seen. In another embodiment, the back office application server is a web hosted application server in an internet environment.

The back-office information systems would typically include Microsoft Dynamics AX 4.0 servers 325, Microsoft Office SharePoint Server 2007 sites 330 or Microsoft Dynamics CRM 3.0 servers 335. A typical Microsoft Dynamics AX 4.0 server 325 setup consists of the database, Object Server and the Enterprise Portal while the Microsoft Dynamics CRM 3.0 335 setup consists of a CRM Database, CRM Web service and the web client.

These back-office information systems are connected to Microsoft Outlook via a middle tier—which consists of three components. Microsoft Office SharePoint Server 2007 Business Data Catalog core service 340 is the first component. The metadata powered Business Data Catalog allows crawling of the respective Microsoft Dynamics AX and Microsoft Dynamics CRM databases and indexes them using metadata driven keys into the SharePoint Metadata Database.

The second component in the middle tier is the BDS Website 310. This component may have three subcomponents:
  The business data search website 310 uses the business data search runtime object model 340 to perform the search and obtain the search results.
  The Authentication layer 345 communicates with Microsoft Dynamics AX using the Microsoft Dynamics AX 4.0 .NET Business Connector (via a web-service) 350 or Microsoft Dynamics CRM 335 using Microsoft Dynamics CRM Web services and authenticates the user's rights to the search results and filters accordingly.
  The Presentation layer presents this information through the BDS Website, which is accessed by a browser control that resides in the user's Microsoft Outlook client 320.

The third component is specific to Microsoft Dynamics AX 4.0 and is called Microsoft Dynamics AX 4.0 .NET Business Connector 350 which enables communication to the Microsoft Dynamics AX 4.0 Object Server 325.

Finally there is the client, Microsoft Outlook 320, in the BDS snap-in architecture. The website is browsed from Microsoft Outlook using a hosted browser controlled from within Outlook and the search results are displayed in a brief and intuitive format.

In one embodiment, only those records are displayed for which the user has sufficient access privileges defined in the back-office information sources.

In another embodiment, pattern matching and word combinations are provided e.g. when a word or a phrase is in double quotes, BDS snap-in searches it as a single phrase along with other word(s) present in the search edit box. For example when the words Light "and design" are entered for search, then the word Light would be one search keyword and "and design" would be another.

Individual search result records can be opened directly in their respective back-office application clients by double-clicking on them in the Microsoft Outlook middle pane. Microsoft Dynamics CRM 3.0 335 records are opened in the Microsoft CRM web-based client whereas the Microsoft Dynamics AX 4.0 325 records are opened in the Enterprise Portal. In case of Microsoft Office SharePoint Server sites 330 results, the document is launched in its respective Microsoft Office application when its search result is double-clicked in the middle pane.

Searchable Entities and Attributes

The Business Data Search snap-in can be configured to search any number of entities and attributes across Microsoft Dynamics AX 4.0 servers, and Microsoft Dynamics CRM 3.0 servers. This configuration may be customized in the Middle tier by using BDC Meta-data file. This list may be modified at any point by editing the BDC XML meta-data file. The following is a list of the entries and their corresponding fields that should be searched whenever a search is made of an AX4.0 application.

In Microsoft Dynamics AX 4.0:

| Entity | Searched Fields (Name as it appears in AX Forms) | Searched fields (Name of field in Table) |
| --- | --- | --- |
| Item | ItemId | Itemid |
|  | Item Name | ItemName |
|  | Item Group | ItemGroup |
| Purchase Orders | Vendor Account | OrderAccount |
|  | Item | ItemId |
|  | Item Name | Name |
|  | Invoice Account | InvoiceAccount |
|  | Status | PurchStatus |
|  | Purchase Type | Purchase Type |
| Sales Orders | Customer Account | CustAccount |
|  | Item | ItemId |
|  | Item Description | Name |
|  | Invoice Account | InvoiceAccount |
|  | Status | SalesStatus |
|  | Sales Type | Sales Type |

| Entity | Searched Fields (Name as it appears in AX Forms) | Searched fields (Name of field in Table) |
|---|---|---|
| Sales Quotations | Customer account | CustAccount |
| | Business Relation | BusRelAccount |
| | Quotation Status | QuotationStatus |
| | Item | ItemId (From SalesQuotationLine Table) |
| | Item Name | Name (From SalesQuotationLine Table) |
| | Sales Person | SalesResponsible |
| Projects | Customer | CustAccount |
| | Project | ProjId |
| | Name | Name |
| | Type | Type |
| | Group | ProjGroupId |
| Services | Customer | CustAccount |
| | Service Description | Description |
| | Project | ProjId |
| | Service Agreement | AgreementId |
| | Service Responsible | Responsible |
| Production Orders | Item | ItemId |
| | Item Name | Item Name |
| | Status | ProdStatus |
| Vendors | Vendor Account | AccountNum |
| | Name | Name |
| | Vendor Group Name | Name(From VendGroup Table) |
| Customers | Customer Account | AccountNum |
| | Name | Name |
| | Customer Group Name | Name(From CustGroup Table) |
| Business Relations | Business Account | BusRelAccount |
| | Name | Name |
| | Type | BusRelTypeId |
| | SalesPerson | MainContact |
| LedgerAccounts | Account | AccountNum |
| | AccountName | AccountName |
| | Type | AccountPLType |
| Fixed Assets | Asset Number | AssetId |
| | Name | Name |
| | Asset Group Name | AssetGroup |
| | Type | AssetType |
| | Make | Make |
| | Model | Model |
| ExchangeRate | CurrencyCode | CurrencyCode |
| | Name | Txt |

In Microsoft Dynamics CRM 3.0:

This list can be modified at any point by editing the BDC XML meta-data file.

Following is the list of entities and their corresponding fields that should be searched whenever a search is made of a CRM 3.0 application:

| Entity | Display Fields |
|---|---|
| Account | Account Name |
| | Account Number |
| | Primary contact |
| | Address1: city |
| | Main Phone |
| | E-mail |
| | Website |
| | Category |
| | Territory |
| | Industry |
| | Ownership |
| Product | Product Name |
| | Subject |
| | Product Type |
| | ID |
| | Status |
| Lead | Topic |
| | Name |
| | Company Name |
| | Web Site |
| | Status reason |
| | Business phone |
| | Email |
| Opportunity | Topic |
| | Potential Customer |
| | Est. Revenue |
| | Est. Close date |
| | Description |
| Campaign | Name |
| | Template |
| | Status Reason |
| | Created On |
| | Campaign Code |
| | Campaign Type |
| | Description |
| Order | Order ID |
| | Name |
| | Customer |
| | Status Reason |
| | Total amount |
| | description |
| Contact | Full Name |
| | Parent Customer |
| | Address1: City |
| | Address1: Phone |
| | Business Phone |
| | E-mail |
| Contract | Contract Name |
| | Contract ID |
| | Customer |
| | Contract Template |
| | Status |
| | Expiration date |
| Quote | Quote ID |
| | Name |
| | Potential Customer |
| | Status reason |
| | Total Amount |
| Invoice | Invoide ID |
| | Name |
| | Customer |
| | Order |
| | Status reason |
| | Total Amount |
| | Due date |
| Case | Title |
| | Customer |
| | Subject |
| | Case Type |
| | Status Reason |
| | Service Level |
| | Case Number |
| | Created On |
| Service Activity | Subject |
| | Service |
| | Customers |
| | Description |
| | Status Reason |
| | Resources |
| | Scheduled Start |
| | Scheduled End |
| Marketing List | Name |
| | Purpose |
| | Description |
| | Last used on |
| Competitor | Name |
| | Website |
| | Ticket Symbol |
| | Key product |

Customizing Business Data Search Snap-In

As described above, the Business Data Search snap-in at its core uses a service called the Business Data Catalog (BDC)

that is part of Microsoft Office SharePoint Server 2007. The BDC core service is capable of interfacing with multiple back-office information servers using a generic XML based Meta-data model that stores the specific interface details of each of the back-office information server. The Microsoft Office SharePoint Server's Search Crawler uses BDC to access and retrieve data from these back-office information servers and maintains indexes for this data in its repository. This indexed data is later used by the BDS server when it needs to search for specific information in the back-office information servers. The BDSConfig utility shipped with the Business Data Search snap-in internally generates this metadata based on the parameter values provided to it. However, this XML Metadata file may be created manually and import it directly into the BDS Server's configuration using the BDSConfig utility. The following variables may be customized in the BDS Server:

1. Locations to be Searched;
2. Entities to be searched within each location;
3. Attributes to be searched within each entity; and
4. Relationships between entities.

The following procedure illustrates how an administrator can add an application definition to "Business Data Catalog" manually after the developer writes and tests the metadata.

To add an application definition to "Business Data Catalog"

1. Open SharePoint Central Administration.
2. Navigate to the Operations page.
3. In the Topology and Services section of the Operations page, click Create or Configure this Farm's Core Services.
4. Select Shared Services Provider (SSP).
5. In the Business Data Catalog Management section, click Add Application to open the Add Application page.
6. In the Add Application page, browse to the XML file that contains the metadata for a business application, and click Import.

At this point, the Business Data Catalog imports metadata information about an application. Next, through a "search settings and schedule" option, the crawling may be set and indexing of the added application may proceed.

The search results may be displayed in a tabular form in the middle pane of the Standard Microsoft Outlook user interface and are categorized by their information sources. In every result category, the search results may be paginated.

FIG. 4 may illustrate how the method of searching data on a computer system may occur. As noted previously, there is no requirement of installing a search program on a user computer. At block 410, a search query may be accepted. There are no limits on the query that may be entered. In one embodiment, the security rights of a search query creator may be determined and only data may be searched that the search query creator has rights.

At block 420, multiple applications on the computer system may be searched for data related to the search query where the data can be in a variety of formats. In one embodiment, the applications that are searched may be selected. The applications may be business applications such as a CRM program, an email program, an accounting program, a supply chain management program, word processing program, ERP application and spreadsheet program. The applications may be remote applications not resident on a single computer.

The search may be accomplished using a search application on a server which is accessed using an assigned url. The search application may have a first tier that includes a user interface client application, a second tier that includes a business data search website and a third tier that includes a connection application that connects a business data search application to the plurality of applications. The second tier may include access logic which uses a business data search runtime object model to do the search and get the search results, an authentication layer that authenticates a search requester with each application to be searched and a presentation layer that presents the search information through the business data search web site.

At block 430, search results may be displayed wherein the search results comprise data related to the search query. The display may include a summary of the found data and the summary may be displayed in an email application. In another embodiment, details of the search results may be displayed in any of the applications searched. The search result may be sorted, filtered, limited to a certain time range or otherwise reviewed.

A user interface may be used to operate the search application. The user interface may include a first field to accept a search query, a second field to allow a selection of one or more applications to be searched for data related to the search query, and a third field to allow a selection of a type of report to be created and a fourth field to allow a selection of the type of application in which the report is to be displayed.

The search application may also be viewed as a plug in for a business computer system where the computer system has a plurality of applications and where the applications are stored remote from a user terminal. The plug in may include a first tier which is a user interface client application, a second tier which includes a business data search website and a third tier which includes a connection application that connects a business data search application to the plurality of applications.

Usage Steps

Consider a scenario where a Sales representative receives an email from a customer reporting that certain item in the last delivered shipment was defective. Before taking any action the sales representative decides to do some research about this particular item. She simply uses the Business Data Search snap-in, available from within her Microsoft Outlook window, and searches for this item across her back-office ERP and CRM systems and Microsoft Office SharePoint sites by entering the item name as the search text in Business Data Search snap-in search box. This search retrieves all the relevant matches found in the various systems within her Microsoft Outlook window for her to see. For instance, she can see the latest quality reports for this item stored in a Microsoft Office SharePoint site, past and present Opportunities and Orders present in the ERP system, as well as Customers who have been recently serviced for this item. The search results enable her to get a very good perspective on the overall state of the item in question and make the right decisions before following up with her customer.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method comprising:

displaying, by an e-mail client application operating on a client computer of a user, a user interface comprising a middle pane and adjacent panes, wherein an adjacent pane comprises a list of folders;

setting, by the e-mail client application in response to input from the user, a webpage of a search application hosted by a server computer system as a homepage of a folder displayed in the adjacent pane, wherein the server computer system indexes data from a plurality of applications on the server computer system which is stored in one or more databases accessed by the server computer system, the plurality of applications comprising different web-based applications that are accessible by the user via a web-browser application of the client computer of the user, each different web-based application offering a search interface;

displaying, by the e-mail client application, a search interface in response to selection by the user of the folder displayed in the adjacent pane of the user interface;

submitting, by the e-mail client application to the search application hosted by the server computer system, a search query entered by the user into the search interface displayed by the email client application, wherein the search query is submitted to the web page of the search application set as the homepage of the folder displayed in the adjacent pane of the email client application;

displaying, by the email client application in the middle pane of the user interface, search results returned by the server computer system in response to the search query, the search results comprising data from multiple web-based applications, wherein the data from the multiple web-based applications includes only data to which the user has security rights; and in response to selection by the user of a search result associated with a respective web-based application of the plurality of applications, accessing the respective web-based application on the server computer system via the web-browser application of the client computer for allowing the user to access data from the respective web-based application which is included in the search result selected by the user.

2. The method of claim 1, wherein:
the search results comprise a summary of the data from the multiple web-based applications.

3. The method of claim 1, wherein:
the search results are presented in a webpage hosted by the server computer system which is displayed within the middle pane of the user interface.

4. The method of claim 1, wherein:
the search results comprise data in a variety of formats.

5. The method of claim 1, wherein:
the search results can be sorted.

6. The method of claim 1, wherein:
the search results can be filtered.

7. The method of claim 3, wherein:
the webpage hosted by the server computer system is accessible by the email client application using a hosted browser controlled from within the email client application without requiring installation of a search program on the client computer.

8. The method of claim 1, wherein:
the search interface displayed by the email client application allows selection by the user of the multiple web-based applications to be searched.

9. The method of claim 1, wherein:
the multiple web-based applications are business applications on the server computer system which are accessible by the user via the web-browser application of the client computer.

10. The method of claim 9, wherein:
the business applications include one or more of: a customer relationship management program, an accounting program, a supply chain management program, a word processing program, an enterprise resource planning program, and a spreadsheet program.

11. The method of claim 1, wherein the server computer system comprises:
middle tier components comprising a business data search application that crawls the one or more databases and indexes the data from the plurality of applications which is stored in the one or more databases.

12. The method of claim 11, wherein the middle tier components further comprise:
a business data search website that uses a business data search runtime object model of the business data search application to obtain the search results;
an authentication layer that authenticates security rights of the user and filters the search results according to the security rights of the user; and
a presentation layer that presents the search results in the business data search web site.

13. A computer system comprising:
a processor for executing computer-executable instructions; and
memory storing computer-executable instructions for:
displaying, by an e-mail client application operating on the computer system, a user interface comprising a middle pane and adjacent panes, wherein an adjacent pane comprises a list of folders;
setting, by the e-mail client application in response to input from a user of the computer system, a webpage of a search application hosted by a server computer system as a homepage of a folder displayed in the adjacent pane, wherein the server computer system indexes data from a plurality of applications on the server computer system which is stored in one or more databases accessed by the server computer system, the plurality of applications comprising different web-based applications that are accessible by the user via a web-browser application of the computer system, each different web-based application offering a search interface;
displaying, by the e-mail client application, a search interface in response to selection by the user of the folder displayed in the adjacent pane of the user interface;
submitting, by the e-mail client application to the search application hosted by the server computer system, a search query entered by the user into the search interface displayed by the email client application, wherein the search query is submitted to the web page of the search application set as the homepage of the folder displayed in the adjacent pane of the email client application;
displaying, by the email client application in the middle pane of the user interface, search results returned by the server computer system in response to the search query, the search results comprising data from multiple web-based applications, wherein the data from the multiple web-based applications includes only data to which the user has security rights; and in response to selection by the user of a search result associated with a respective web-based application of the plurality of applications, accessing the respective web-based application on the server computer system via the web-browser application of the computer system for allowing the user to access data from the respective web-based application which is included in the search result selected by the user.

14. The computer system of claim 13, wherein:
the search results are presented in a webpage hosted by the server computer system which is displayed within the middle pane of the user interface.

15. The computer system of claim 14, wherein:
the webpage hosted by the server computer system is accessible by the email client application using a hosted browser controlled from within the email client application without requiring installation of a search program on the remote client computer system.

16. The computer system of claim 13, wherein the server computer system comprises:
a business data search application that crawls the one or more databases and indexes the data from the plurality of applications which is stored in the one or more databases;
a business data search website that uses a business data search runtime object model of the business data search application to obtain the search results;
an authentication layer that authenticates security rights of the user and filters the search results according to the security rights of the user; and
a presentation layer that presents the search results in the business data search web site.

17. A computer-readable storage device storing computer-executable instructions that, when executed by a processor of a computer system, cause the computer system to perform a method comprising:
displaying, by an e-mail client application operating on the computer system, a user interface comprising a middle pane and adjacent panes, wherein an adjacent pane comprises a list of folders;
setting, by the e-mail client application in response to input from the user of the computer system, a webpage of a search application hosted by a server computer system as a homepage of a folder displayed in the adjacent pane, wherein the server computer system indexes data from a plurality of applications on the server computer system which is stored in one or more databases accessed by the server computer system, the plurality of applications comprising different web-based applications that are accessible by the user via a web-browser application of the computer system, each different web-based application offering a search interface;
displaying, by the e-mail client application, a search interface in response to selection by the user of the folder displayed in the adjacent pane of the user interface;
submitting, by the e-mail client application to the search application hosted by the server computer system, a search query entered by the user into the search interface displayed by the email client application, wherein the search query is submitted to the web page of the search application set as the homepage of the folder displayed in the adjacent pane of the email client application;
displaying, by the email client application in the middle pane of the user interface, search results returned by the server computer system in response to the search query, the search results comprising data from multiple web-based applications, wherein the data from the multiple web-based applications includes only data to which the user has security rights; and
in response to selection by the user of a search result associated with a respective web-based application of the plurality of applications, accessing the respective web-based application on the server computer system via the web-browser application of the computer system for allowing the user to access data from the respective web-based application which is included in the search result selected by the user.

18. The computer-readable storage device of claim 17, wherein:
the search interface displayed by the email client application allows selection by the user of the multiple web-based applications to be searched.

19. The computer system of claim 13, wherein:
the search interface displayed by the email client application allows selection by the user of the multiple web-based applications to be searched.

20. The computer-readable storage device of claim 17, wherein:
the search results are presented in a webpage hosted by the server computer system which is displayed within the middle pane of the user interface.

* * * * *